United States Patent
Zhao

(10) Patent No.: US 12,096,466 B2
(45) Date of Patent: Sep. 17, 2024

(54) METHOD AND DEVICE FOR DETERMINING PUCCH TO BE TRANSMITTED

(71) Applicant: Beijing Xiaomi Mobile Software Co., Ltd., Beijing (CN)

(72) Inventor: Qun Zhao, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 730 days.

(21) Appl. No.: 17/277,059

(22) PCT Filed: Sep. 18, 2018

(86) PCT No.: PCT/CN2018/106189
§ 371 (c)(1),
(2) Date: Mar. 17, 2021

(87) PCT Pub. No.: WO2020/056584
PCT Pub. Date: Mar. 26, 2020

(65) Prior Publication Data
US 2021/0377962 A1    Dec. 2, 2021

(51) Int. Cl.
*H04W 72/56* (2023.01)
*H04W 72/0446* (2023.01)
*H04W 72/21* (2023.01)

(52) U.S. Cl.
CPC ....... *H04W 72/56* (2023.01); *H04W 72/0446* (2013.01); *H04W 72/21* (2023.01)

(58) Field of Classification Search
CPC ................. H04W 72/56; H04W 72/21; H04W 72/0446
See application file for complete search history.

(56) References Cited

U.S. PATENT DOCUMENTS

2013/0272231 A1* 10/2013 Dinan ..................... H04L 69/22
370/329
2013/0279435 A1* 10/2013 Dinan ................... H04W 52/40
370/329

(Continued)

OTHER PUBLICATIONS

Intel Corporation, "Remaining details on NR PUCCH", 3GPP TSG RAN WG1 Meeting #94, R1-1808673, Gothenburg, Sweden, Aug. 20-24, 2018, 6 pages.

(Continued)

*Primary Examiner* — Jael M Ulysse
(74) *Attorney, Agent, or Firm* — Finnegan, Henderson, Farabow, Garrett & Dunner, L.L.P

(57) ABSTRACT

A method for determining a physical uplink control channel (PUCCH) to be transmitted, includes: determining a plurality of overlapping PUCCHs in a time domain unit; determining an checking order for the PUCCHs according to preset characteristic parameters of the PUCCHs; checking the plurality of overlapping PUCCHs one by one according to the checking order, and determining a relationship between priority levels of other PUCCHs overlapping with a currently checked PUCCH in the time-domain unit and a priority level of the currently checked PUCCH; and determining a target PUCCH to be transmitted in the time-domain unit according to a checking result, and ignoring other PUCCHs overlapping with the target PUCCH.

20 Claims, 14 Drawing Sheets

(56) References Cited

U.S. PATENT DOCUMENTS

| | | | |
|---|---|---|---|
| 2014/0369324 A1* | 12/2014 | Lin ................... | H04W 56/0005 370/336 |
| 2016/0295522 A1* | 10/2016 | Qin ....................... | H04W 52/28 |
| 2018/0278380 A1* | 9/2018 | Kim ...................... | H04L 1/1812 |
| 2019/0246416 A1* | 8/2019 | Park ..................... | H04L 1/1812 |
| 2019/0313462 A1* | 10/2019 | Lin .................... | H04W 74/0833 |
| 2019/0363843 A1* | 11/2019 | Gordaychik .............. | H04L 1/08 |
| 2020/0068599 A1* | 2/2020 | Yang .................... | H04L 5/0055 |
| 2020/0169960 A1* | 5/2020 | Dinan ................. | H04W 56/005 |
| 2020/0344032 A1* | 10/2020 | Yang .................... | H04L 5/0053 |
| 2020/0396759 A1* | 12/2020 | Baldemair ............ | H04L 5/0055 |
| 2021/0021315 A1* | 1/2021 | Song .................... | H04L 5/0057 |
| 2022/0279453 A1* | 9/2022 | Dinan ............... | H04W 56/0005 |

OTHER PUBLICATIONS

Catt, "Corrections to UCI feedback procedures", 3GPP TSG RAN WG1 Meeting #94, R1-1808379, Gothenburg, Sweden, Aug. 20-24, 2018, 16 pages.
Extended European Search Report in Application No. 18934507.7, issued Aug. 5, 2021.
Office Action for European Patent Application No. 18934507.7, issued Apr. 20, 2023, 108 pages.
3GPP TS 38.213 V15.2.0 (Jun. 2018), 3rd Generation Partnership Project; Technical Specification Group Radio Access Network; NR; Physical layer procedures for control (Release 15), 2018, 99 pages, http://www.3gpp.org.

* cited by examiner ized as the preset characteristic parameters, and the checking order for the PUCCHs may be determined according to the preset characteristic parameters of the PUCCHs. In the case of the checking order being determined, the checking result obtained by checking the multiple PUCCHs one by one according to the checking order is also determinate. Then for the user device, the target PUCCH to be transmitted in the time domain unit may be determined according to the checking result. For the base station, the target PUCCH to be transmitted by the user device in the time domain unit may be determined according to the checking result, that is, the target PUCCH to be received in the time domain unit may be determined, thereby ensuring that the PUCCH transmitted by the user device may be accurately received by the base station, and ensuring good communication quality between the user device and the base station.
METHOD AND DEVICE FOR DETERMINING PUCCH TO BE TRANSMITTED

CROSS REFERENCE TO RELATED APPLICATIONS

This application is a national phase application based on International Application No. PCT/CN2018/106189, filed Sep. 18, 2018, the content of which is incorporated herein by reference.

FIELD

The present disclosure relates to the field of communication technologies, and more particularly to a method for determining PUCCH to be transmitted, an apparatus for determining PUCCH to be transmitted, an electronic device and a computer readable storage medium.

BACKGROUND

In one time domain unit, a user device may be scheduled or configured to transmit overlapping PUCCHs (Physical Uplink Control Channels) in the time domain unit. In order to reduce a peak-to-average ratio of a signal sent by the user device, in related technologies, for the PUCCHs that are configured to be transmitted in multiple time domain units, when overlapping PUCCHs exist in a certain time domain unit, it is required to determine one PUCCH for transmission from the overlapping PUCCHs, according to a priority level of each PUCCH in the overlapping PUCCHs.

However, under some situations, there may be multiple groups of overlapping PUCCHs in one time domain unit. In order to compare priority levels of the PUCCHs, it is required to determine priority levels with respect to each group of PUCCHs. However, determining the priority levels of the groups of PUCCHs based on different orders will result in different checking results, and a base station does not know the checking result of the user device, therefore, the base station is unable to determine which PUCCHs are required to be received, which may cause a problem of not receiving the PUCCHs, thereby affecting communication quality.

SUMMARY

In view of this, embodiments of the present disclosure provide a method for determining PUCCH to be transmitted, an apparatus for determining PUCCH to be transmitted, an electronic device and a computer readable storage medium.

According to a first aspect of embodiments of the present disclosure, a method for determining PUCCH to be transmitted is provided. The method includes:

determining a plurality of overlapping PUCCHs in a time domain unit;

determining a checking order for the PUCCHs according to preset characteristic parameters of the PUCCHs;

checking the plurality of PUCCHs one by one according to the checking order, and determining a relationship between priority levels of other PUCCHs overlapping with a currently checked PUCCH in the time domain unit and a priority level of the currently checked PUCCH;

determining a target PUCCH to be transmitted in the time domain unit according to the checking result, and ignoring other PUCCHs overlapping with the target PUCCH.

According to a second aspect of embodiments of the present disclosure, an apparatus for determining PUCCH to be transmitted is provided. The apparatus includes:

an overlapping determining module, configured to determine a plurality of overlapping PUCCHs in a time domain unit;

an order determining module, configured to determine a checking order for the PUCCHs according to preset characteristic parameters of the PUCCHs;

a relationship determining module, configured to check the plurality of PUCCHs one by one according to the checking order, and determine a relationship between priority levels of other PUCCHs overlapping with a currently check PUCCH in the time domain unit and a priority level of the currently check PUCCH;

a transmission determining module, configured to determine a target PUCCH to be transmitted in the time domain unit according to the check result, and ignore other PUCCHs overlapping with the target PUCCH.

According to a third aspect of embodiments of the present disclosure, an electronic device is provided. The electronic device includes:

a processor;

a memory configured to store instructions executable by the processor;

in which, the processor is configured to execute the method according to any of the above embodiments.

According to a fourth aspect of embodiments of the present disclosure, a computer readable storage medium is provided. The computer readable storage medium has a program stored thereon, when the program is executed by a processor, steps of the method according to any of the above embodiments are implemented.

With embodiments of the present disclosure, one or more characteristic parameters from the variety of characteristic parameters of the PUCCHs may be preset as the preset characteristic parameters, and the checking order for the PUCCHs may be determined according to the preset characteristic parameters of the PUCCHs. In the case of the checking order being determined, the checking result obtained by checking the multiple PUCCHs one by one according to the checking order is also determinate. Then for the user device, the target PUCCH to be transmitted in the time domain unit may be determined according to the checking result. For the base station, the target PUCCH to be transmitted by the user device in the time domain unit may be determined according to the checking result, that is, the target PUCCH to be received in the time domain unit may be determined, thereby ensuring that the PUCCH transmitted by the user device may be accurately received by the base station, and ensuring good communication quality between the user device and the base station.

BRIEF DESCRIPTION OF THE DRAWINGS

In order to more clearly describe the technical solutions in embodiments of the present disclosure, the following briefly introduces the accompanying drawings required for describing the embodiments. Obviously, the accompanying drawings in the following description are only embodiments of the present disclosure. Other drawings can be obtained based on these drawings, for those skilled in the art, without inventive labor.

DETAILED DESCRIPTION

Referring to the accompanying drawings in embodiments of the present disclosure, clear and complete descriptions are made on the technical solution of embodiments of the present disclosure. Obviously, the described embodiments are merely part of the embodiments of the present disclosure, not all of the embodiments. On the basis of the embodiments in the present disclosure, all other embodiments obtained by those skilled in the art without having done any inventive work shall fall within the protection scope of the present disclosure.

Figure 1:
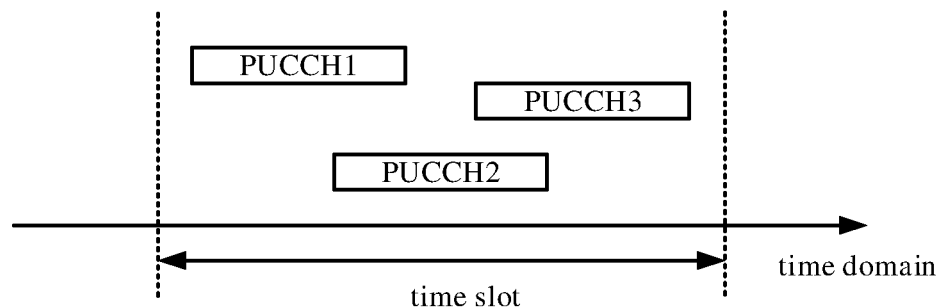
FIG. 1 is a schematic diagram illustrating multiple overlapping PUCCHs within one time slot.

FIG. 1 is a schematic diagram illustrating multiple overlapping PUCCHs within one time slot.

For example, as illustrated in FIG. 1, PUCCH1 and PUCCH2 overlap in one time slot, and PUCCH2 and PUCCH3 overlap in the time slot. A priority level of PUCC1 is higher than that of PUCCH2, and the priority level of PUCCH2 is higher than that of PUCCH3.

Figure 2:
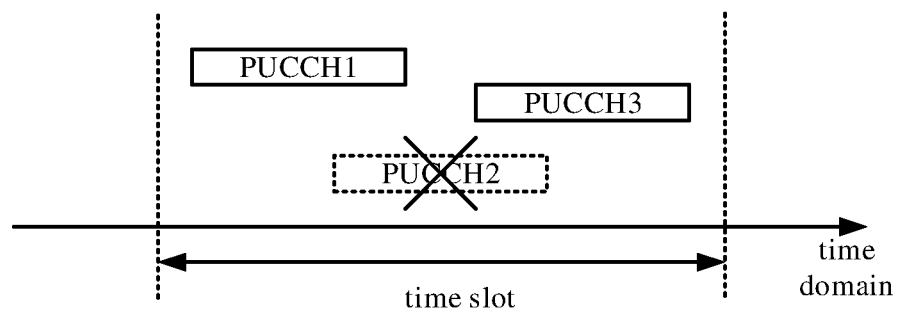
FIG. 2 is a schematic diagram illustrating a checking result for multiple overlapping PUCCHs illustrated in FIG. 1.

FIG. 2 is a schematic diagram illustrating a checking result for multiple overlapping PUCCHs illustrated in FIG. 1.

When priority levels of PUCCH1 and PUCCH2 are checked first, the priority level of PUCCH1 is higher than the priority level of PUCCH2, and thus PUCCH1 is determined as a PUCCH to be transmitted, and PUCCH2 is ignored in the subsequent checking process. Then for PUCCH3, since PUCCH2 is ignored, it is considered that there is no PUCCH that overlaps with PUCCH3, such that PUCCH3 can be transmitted. The final checking result is illustrated in FIG. 2. It is determined that PUCCH1 and PUCCH3 are to be transmitted in this time slot according to the checking result.

Figure 3:
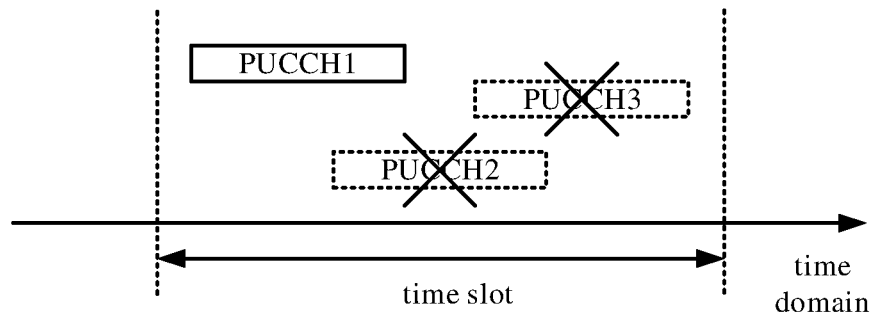
FIG. 3 is a schematic diagram illustrating another checking result for multiple overlapping PUCCHs illustrated in FIG. 1.

FIG. 3 is a schematic diagram illustrating another checking result for multiple overlapping PUCCHs illustrated in FIG. 1.

When priority levels of PUCCH2 and PUCCH3 are checked first, the priority level of PUCCH2 is higher than the priority level of PUCCH3, and thus PUCCH2 is determined as a PUCCH to be transmitted, and PUCCH3 is ignored in the subsequent checking process. Then for PUCCH2, since PUCCH1 and PUCCH2 overlap, it is required to check the priority levels of PUCCH1 and PUCCH2. The priority level of PUCCH1 is higher than the priority level of PUCCH2, and thus PUCCH1 is determined as the PUCCH to be transmitted. The final checking result is illustrated in FIG. 3. It is determined that PUCCH1 is to be transmitted in this time slot according to the checking result.

It can be seen that the checking result of the embodiment illustrated in FIG. 2 is different from that of the embodiment illustrated in FIG. 3, which results in that a user device is incapable of predetermining which checking result is used to determine the PUCCH to be transmitted. Accordingly, a base station is also incapable of predetermining the PUCCH to be transmitted by the user device, which causes that the base station is incapable of determining which PUCCHs are to be received, thereby causing a problem of not receiving the PUCCH and affecting communication quality.

Figure 4:
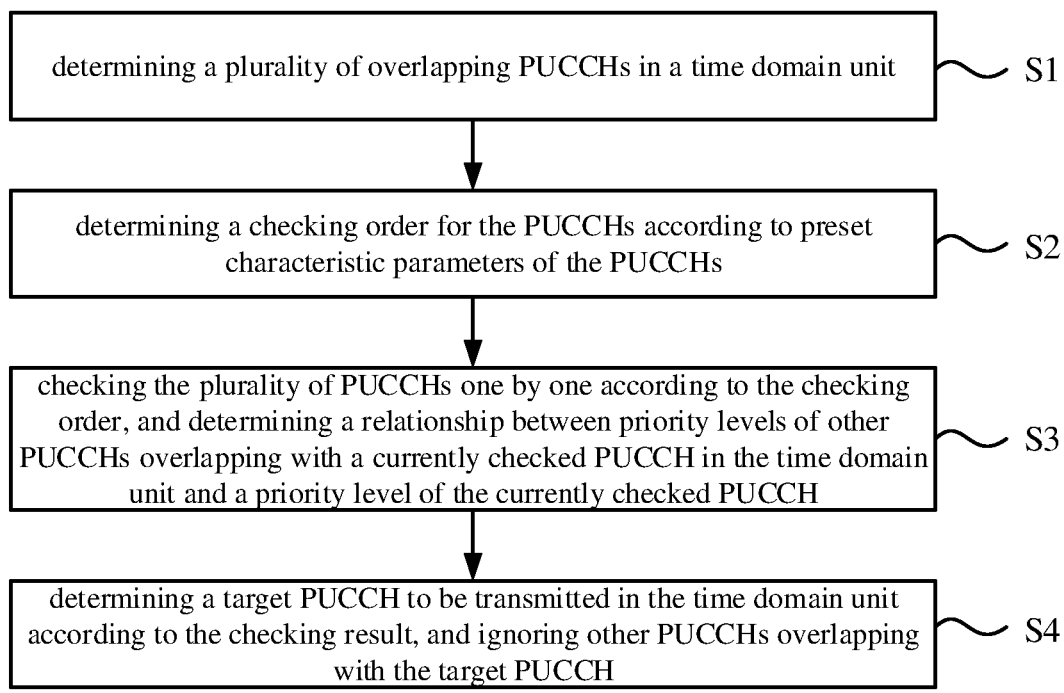
FIG. 4 is a flowchart illustrating a method for determining PUCCH to be transmitted according to an embodiment of the present disclosure.

FIG. 4 is a flowchart illustrating a method for determining PUCCH to be transmitted according to an embodiment of the present disclosure. The embodiments may be applicable for the user device, and may also be applicable for the base station. The user device may communicate with the base station. The user device may be an electronic device, such as a mobile phone, a tablet computer, a wearable device, and the user device may communicate with the base station based on 4G or 5G technology.

As illustrated in FIG. 4, the method for determining PUCCH to be transmitted includes the followings.

In step S1, multiple overlapping PUCCHs in a time domain unit are determined.

In an embodiment, the time domain unit may include the time slot as illustrated in FIG. 1, and may also include a frame, a sub-frame, a symbol, and the like. The overlapping PUCCHs in the time domain unit mean that for multiple PUCCHs, there is at least one PUCCH overlapping with other PUCCHs respectively in the time domain unit, but other PUCCHs may overlap in the time domain unit or not.

For example, for the embodiment illustrated in FIG. 1, for PUCCH1, PUCCH2, and PUCCH3, PUCCH2 overlaps with PUCCH1 and PUCCH3 respectively in the time domain unit, but PUCCH1 and PUCCH3 do not overlap in the time domain unit. The three PUCCHs are multiple overlapping PUCCHs in the time domain unit. Certainly, when PUCCH1 and PUCCH3 also overlap in this time domain unit, then these three PUCCHs are also multiple overlapping PUCCHs in this time domain unit.

It should be noted that for any PUCCH, it may be configured to be transmitted in multiple time domain units.

In step S2, a checking order for the PUCCHs is determined according to preset characteristic parameters of the PUCCHs.

In step S3, multiple PUCCHs are checked one by one according to the checking order, and a relationship between priority levels of other PUCCHs overlapping with a currently checked PUCCH in the time domain unit and a priority level of the currently checked PUCCH is determined.

In step S4, a target PUCCH to be transmitted in the time domain unit is determined according to the checking result, and other PUCCHs overlapping with the target PUCCH are ignored.

For each PUCCH, it may have a variety of characteristic parameters, such as a priority level, a starting time domain unit of the PUCCH (that is, the earliest time domain unit in the multiple time domain units in which the PUCCH is configured to be transmitted). When the checking order for the PUCCHs is not determined, in the case of the embodiment illustrated in FIG. 1, the checking may be made according to an order of priority levels of the PUCCHs from high to low, to obtain the checking result in the embodiment illustrated in FIG. 2, or the checking may be made according to an order of priority levels of the PUCCHs from low to high, to obtain the checking result in the embodiment illustrated in FIG. 3, which causes the problems that the user device is incapable of predetermining which PUCCH is to be transmitted, and the base station is incapable of determining which PUCCH is to be received.

In an embodiment, one or more characteristic parameters may be preset as the preset characteristic parameters from the variety of characteristic parameters of the PUCCHs, and the checking order for the PUCCHs may be determined according to the preset characteristic parameters of the PUCCHs. In the case of the checking order being determined, the checking result obtained by checking multiple PUCCHs one by one according to the checking order is also determinate. Then for the user device, the target PUCCH to be transmitted in the time domain unit is determined according to the checking result. For the base station, the target PUCCH to be transmitted by the user device in the time domain unit may be determined according to the checking result, that is, the target PUCCH to be received in the time domain unit may be determined, thereby ensuring that the PUCCH transmitted by the user device may be accurately received by the base station, and ensuring good communication quality between the user device and the base station.

It should be noted that the target PUCCH determined according to this embodiment is the PUCCH that is to be transmitted in the time domain unit. Whether the user device actually transmits the target PUCCH in the time domain unit may be further determined according to an actual situation.

Figure 5:
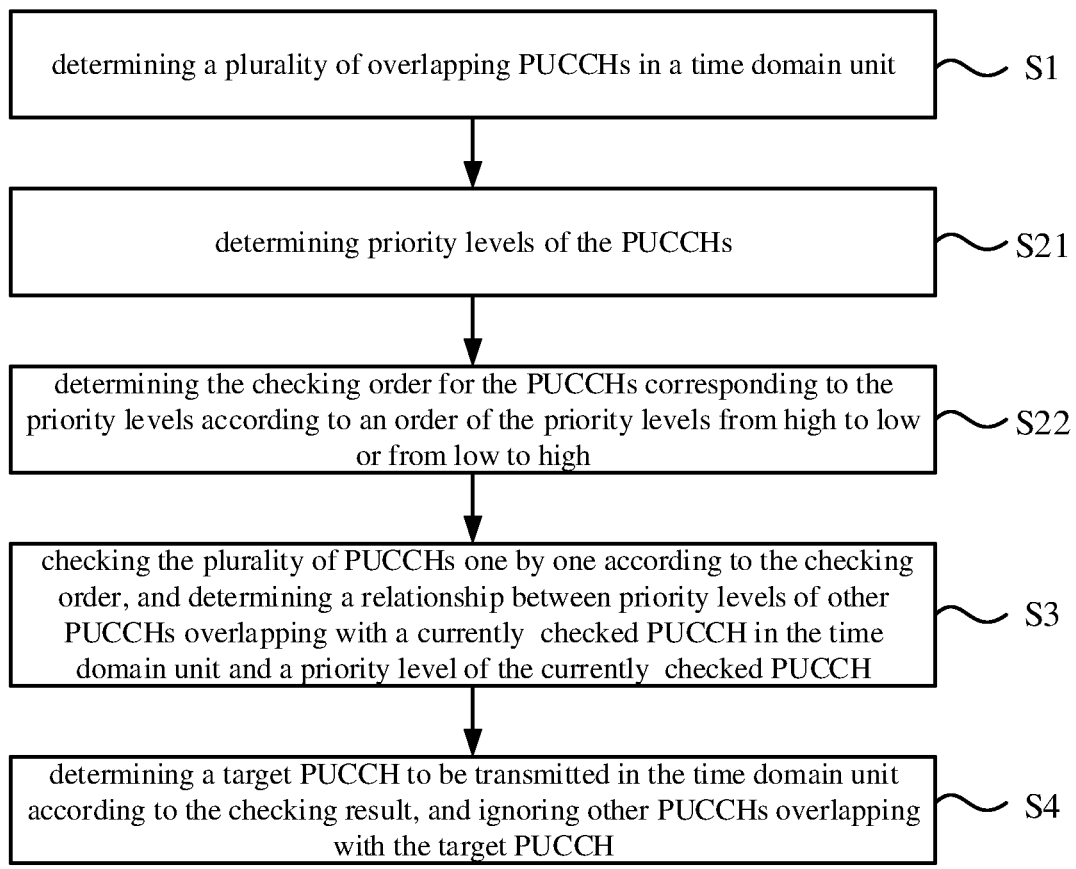
FIG. 5 is a flowchart illustrating a method for determining PUCCH to be transmitted according to another embodiment of the present disclosure.

FIG. 5 is a flowchart illustrating a method for determining PUCCH to be transmitted according to another embodiment of the present disclosure. As illustrated in FIG. 5, on the basis of the embodiment as illustrated in FIG. 4, determining the checking order for the PUCCHs according to the preset characteristic parameters of the PUCCHs includes the followings.

In step S21, priority levels of the PUCCHs are determined.

In step S22, the checking order for the PUCCHs corresponding to the priority levels is determined according to an order of the priority levels from low to high or from high to low.

In an embodiment, the priority level of the PUCCH may be determined based on UCI (Uplink Control Information) carried by the PUCCH. The UCI includes an indication for a HARQ (Hybrid automatic repeat request), a SR (Scheduling Request), or CSI (Channel State Information), etc., and the priority levels of the PUCCHs carrying different UCIs are different. For example, the priority level of a PUCCH carrying the indication for the HARQ is higher than the priority level of a PUCCH carrying the scheduling request. The priority level of the PUCCH carrying the scheduling request is higher than the priority level of a PUCCH carrying CSI.

The priority levels may also be further distinguished based on the CSI. For example, priority levels of different CSIs are different. The priority level of a PUCCH that carries CSI of a high priority level is higher than that of a PUCCH that carries CSI of a low priority level.

For example, the preset characteristic information is the priority level of the PUCCH, then determining the checking order for the PUCCHs according to the priority levels of the PUCCHs may refer to determining according to the order of the priority levels of the PUCCHs from high to low. Under this case, for the embodiment as illustrated in FIG. 1, the checking result is as illustrated in the embodiment in FIG. 2. The user device may determine that PUCCH1 and PUCCH3 are target PUCCHs to be transmitted, and the base station may also determine that PUCCH1 and PUCCH3 are to be received.

For example, the preset characteristic information is the priority level of the PUCCH, then determining the checking order for the PUCCHs according to the priority levels of the PUCCHs may refer to determining according to the order of the priority levels of the PUCCHs from low to high. Under this case, for the embodiment as illustrated in FIG. 1, the checking result is as illustrated in the embodiment in FIG. 3. The user device may determine that PUCCH1 is the target PUCCH to be transmitted, and the base station may also determine that PUCCH1 is to be received.

Figure 6:
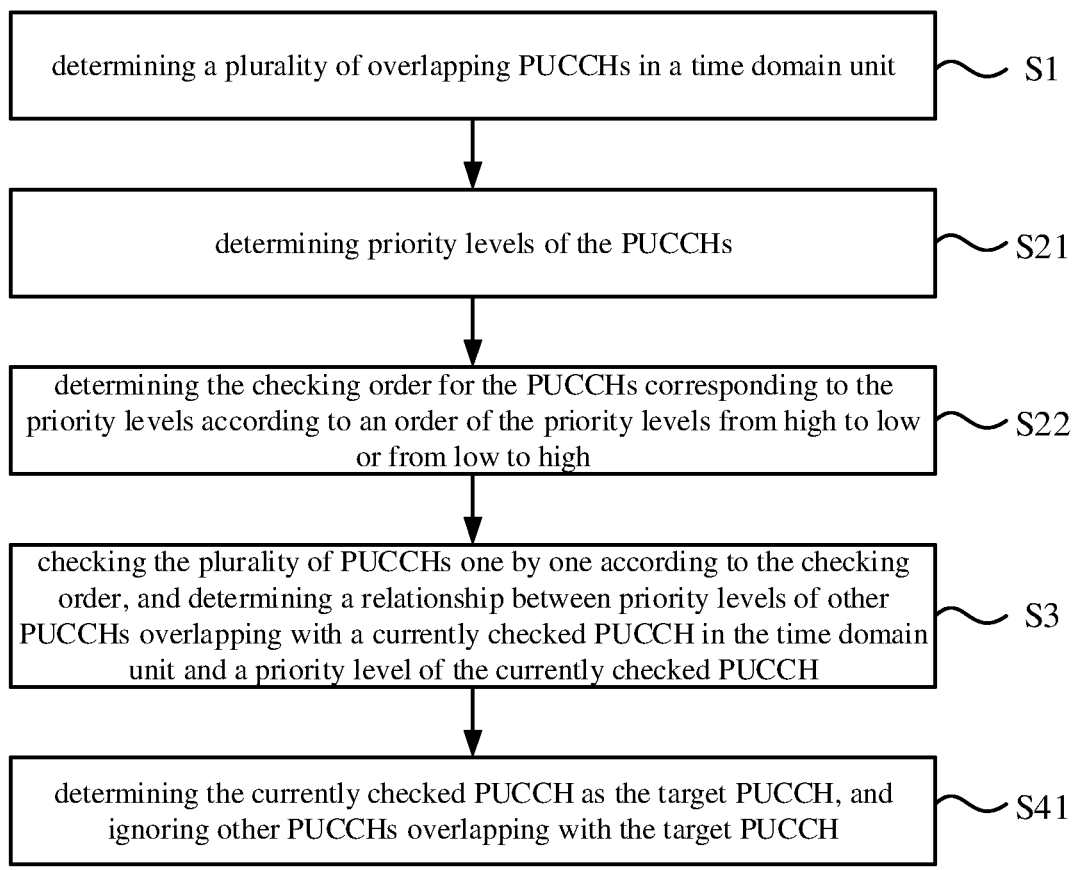
FIG. 6 is a flowchart illustrating a method for determining PUCCH to be transmitted according to still another embodiment of the present disclosure.

FIG. 6 is a flowchart illustrating a method for determining PUCCH to be transmitted according to still another embodiment of the present disclosure. As illustrated in FIG. 6, on the basis of the embodiment as illustrated in FIG. 5, when the checking order for the PUCCHs corresponding to the priority levels is determined according to the order of the priority levels from high to low, determining the target PUCCH to be transmitted in the time domain unit according to the checking result includes the following.

In step S41, the currently checked PUCCH is determined as the target PUCCH.

In an embodiment, in the case of determining the checking order for the PUCCHs corresponding to the priority levels according to the order of the priority levels from high to low, for the currently checked PUCCH (the currently checked PUCCH is not ignored because it is required to be checked, namely, does not overlap with previously checked PUCCHs), since each PUCCH whose priority level is higher than the priority level of the currently checked PUCCH has been checked, the currently checked PUCCH is the PUCCH with the highest priority level among the remaining PUCCHs, the currently checked PUCCH may be directly determined as the target PUCCH. Therefore, it is not required to determine whether there is a PUCCH with a higher priority level in the remaining PUCCHs, which is beneficial to reduce resource consumption.

Figure 7:
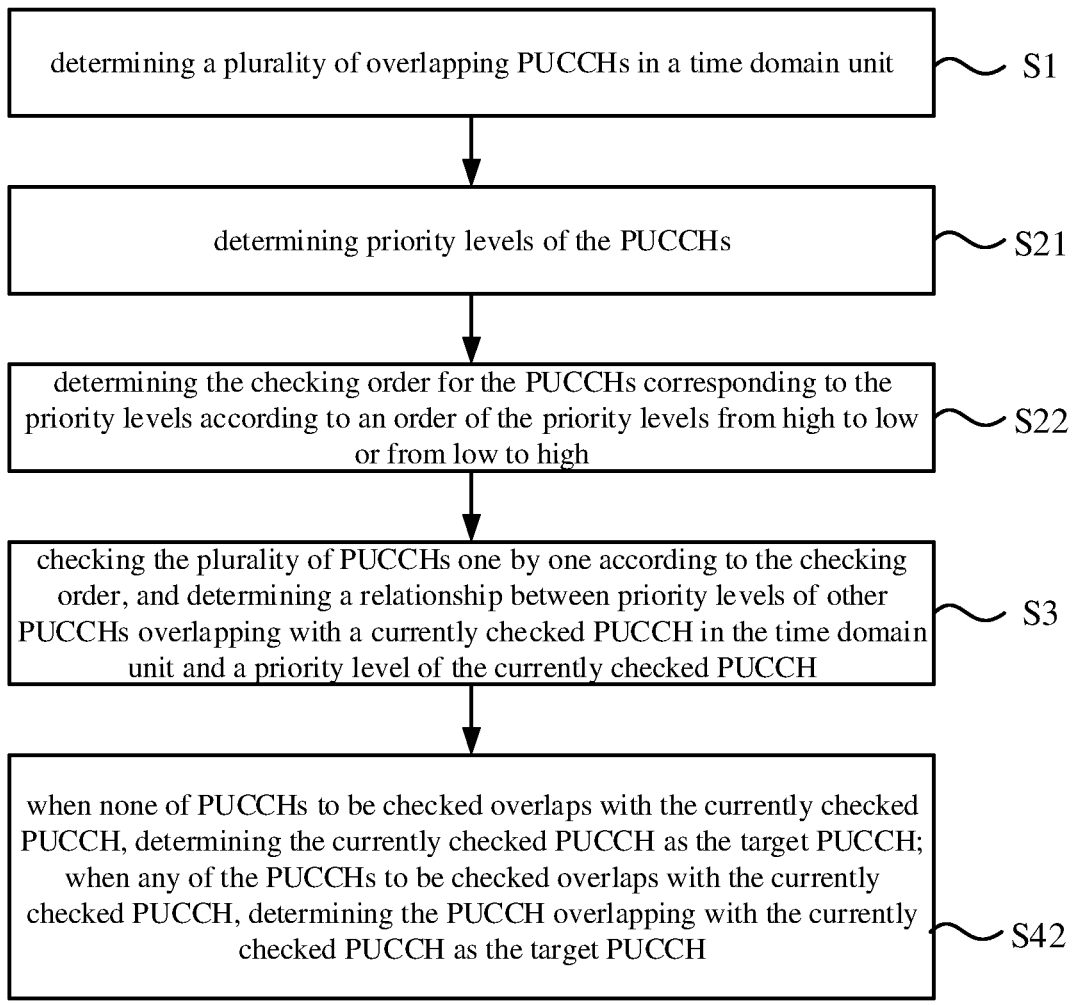
FIG. 7 is a flowchart illustrating a method for determining PUCCH to be transmitted according to yet another embodiment of the present disclosure.

FIG. 7 is a flowchart illustrating a method for determining PUCCH to be transmitted according to yet another embodiment of the present disclosure. As illustrated in FIG. 7, on the basis of the embodiment as illustrated in FIG. 5, when the checking order for the PUCCHs corresponding to the priority levels is determined according to the order of the priority levels from low to high, determining the target PUCCH to be transmitted in the time domain unit according to the checking result includes the following.

In step S42, when none of PUCCHs to be checked overlaps with the currently checked PUCCH, the currently checked PUCCH is determined as the target PUCCH; when any of the PUCCHs to be checked overlaps with the currently checked PUCCH, the PUCCH overlapping with the currently checked PUCCH is determined as the target PUCCH.

In an embodiment, in the case of determining the checking order for the PUCCHs corresponding to the priority levels according to the order of the priority levels from low to high, for the currently checked PUCCH, since each PUCCH whose priority level is lower than the priority level of the currently checked PUCCH has been checked, the priority level of the currently checked PUCCH is lower than that of each PUCCH to be checked. Therefore, it is only required to determine whether any of the PUCCHs to be checked overlaps with the currently checked PUCCH. When none of the PUCCHs to be checked overlaps with the currently checked PUCCH, the currently checked PUCCH may be directly determined as the target PUCCH. When any of the PUCCHs to be checked overlaps with the currently checked PUCCH, the PUCCH overlapping with the currently checked PUCCH may be directly determined as the target PUCCH. Therefore, it is not required to compare the priority levels of the currently checked PUCCH and the PUCCHs overlapping with the currently checked PUCCH, which is beneficial to reduce the resource consumption.

Figure 8:
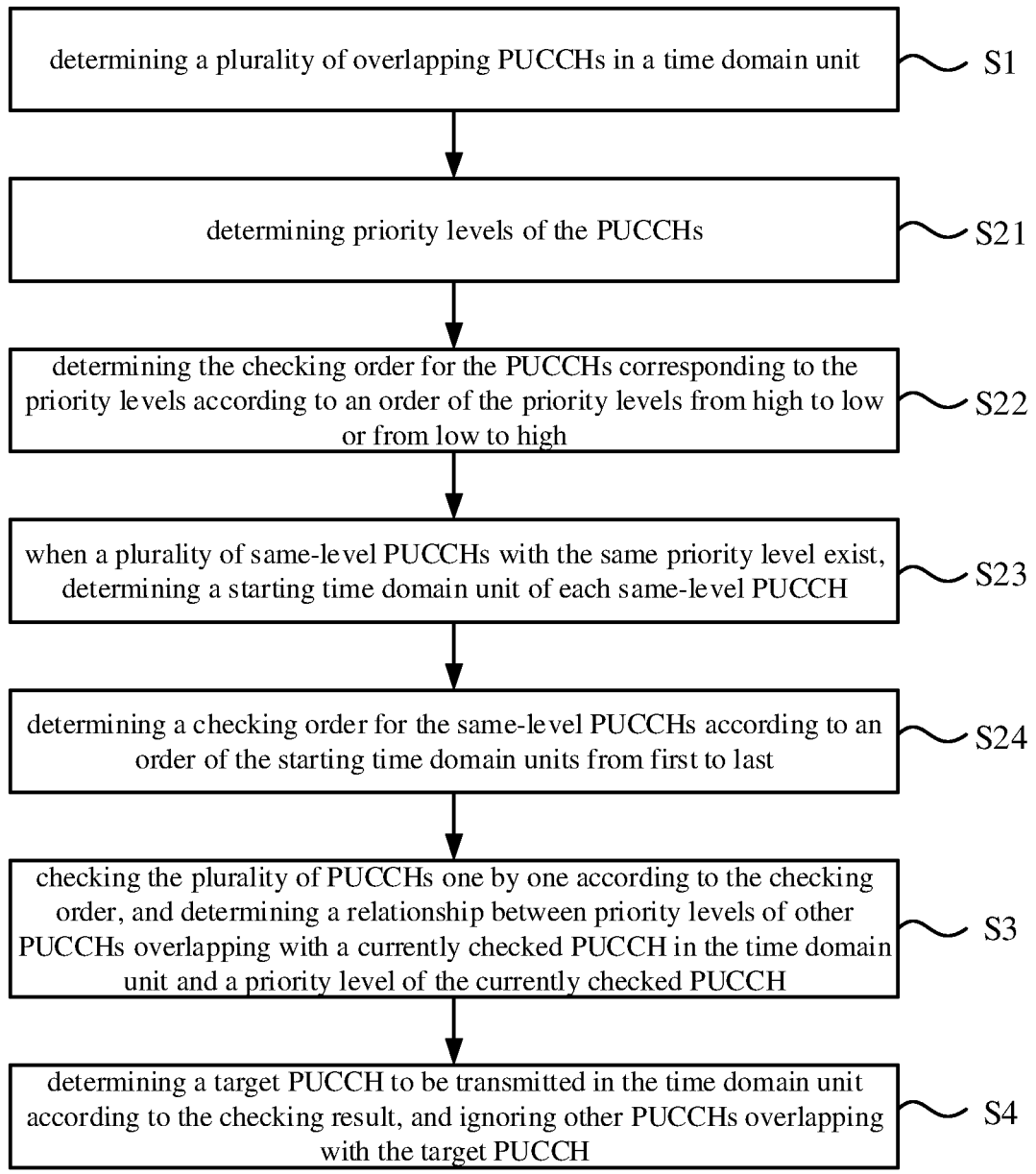
FIG. 8 is a flowchart illustrating a method for determining PUCCH to be transmitted according to yet another embodiment of the present disclosure.

FIG. 8 is a flowchart illustrating a method for determining PUCCH to be transmitted according to yet another embodiment of the present disclosure. As illustrated in FIG. 8, on the basis of the embodiment as illustrated in FIG. 5, determining the checking order for the PUCCHs according to the preset characteristic parameters of the PUCCHs includes the followings.

In step S23, when multiple same-level PUCCHs with the same priority level exist, a starting time domain unit of each same-level PUCCH is determined.

In step S24, a checking order for the same-level PUCCHs is determined according to an order of the starting time domain units from first to last.

In an embodiment, the preset characteristic parameters may include various parameters, for example, the starting time domain unit of the PUCCH in addition to the priority level of the PUCCH in the embodiment illustrated in FIG. 5. In this embodiment, the checking order for the PUCCHs corresponding to the priorities may be determined according to the order of the priority levels from high to low or from low to high. In this process, there may be PUCCHs with the same priority level.

For example, PUCCH4 and PUCCH5 are the same-level PUCCHs with the same priority level. In order to determine the checking order for PUCCH4 and PUCCH5, the starting time domain unit of each same-level PUCCH is further determined. That is, PUCCH4 is configured to be transmitted in multiple time domain units, and PUCCH5 is also configured to be transmitted in multiple time domain units, then the starting time domain unit in multiple time domain units corresponding to PUCCH4 and the starting time domain unit in multiple time domain units corresponding to PUCCH5 may be determined. And then the checking order for the same-level PUCCHs is determined according to the order of the starting time domain units from first to last. For example, the starting time domain unit corresponding to PUCCH4 is before the starting time domain unit corresponding to PUCCH5, then PUCCH4 may be checked first, and then PUCCH5 may be checked, such that it is ensured that the checking order for PUCCH4 and PUCCH5 can be determined.

Figure 9:
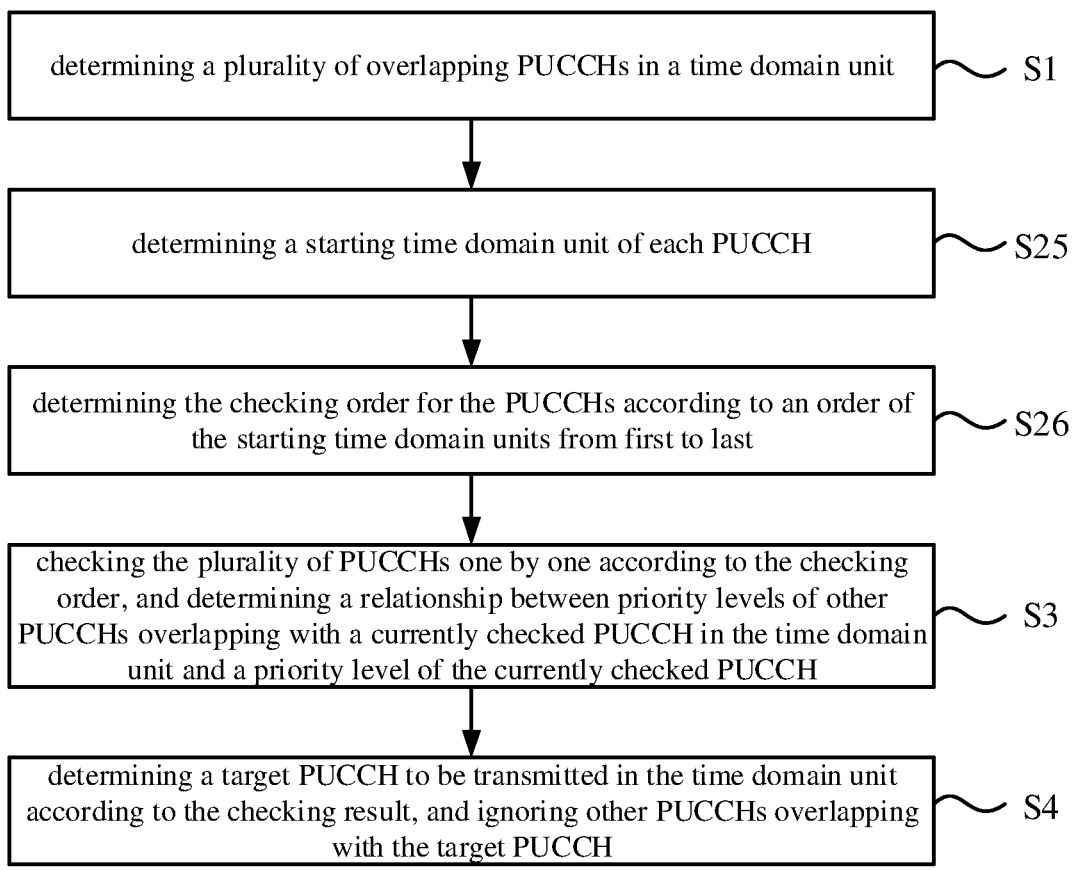
FIG. 9 is a flowchart illustrating a method for determining PUCCH to be transmitted according to yet another embodiment of the present disclosure.

FIG. 9 is a flowchart illustrating a method for determining PUCCH to be transmitted according to yet another embodiment of the present disclosure. As illustrated in FIG. 9, on the basis of the embodiment as illustrated in FIG. 4, determining the checking order for the PUCCHs according to the preset characteristic parameters of the PUCCHs includes the followings.

In step S25, a starting time domain unit of each PUCCH is determined.

In step S26, the checking order for the PUCCHs is determined according to an order of the starting time domain units from first to last.

In an embodiment, in addition to determining the checking order for the PUCCHs according to the priority levels of the PUCCHs (the embodiment illustrated in FIG. 5), as illustrated in this embodiment, the checking order for the PUCCHs may be determined according to the order of the starting time domain units from first to last. For example, taking the embodiment illustrated in FIG. 1 as an example, the starting time domain unit of PUCCH3 is the earliest one, the starting time domain unit of PUCCH2 is the next one, and the starting time domain unit of PUCCH1 is the last one. Then the determined checking order is PUCCH3 first, PUCCH2 next, and PUCCH1 last.

That is, PUCCH3 is checked first, and PUCCH2 is determined as the PUCCH overlapping with PUCCH3. Further, the priority level of PUCCH3 is compared with that of PUCCH2, PUCCH2 has a higher priority level, and PUCCH3 is ignored. Then, PUCCH2 is checked, to determine the PUCCH overlapping with PUCCH2. Since PUCCH3 has been ignored, only PUCCH1 overlaps with PUCCH2, the priority level of PUCCH2 is compared with that of PUCCH1, PUCCH1 has a higher priority level, then PUCCH2 is ignored, and PUCCH1 is determined as the target PUCCH.

Figure 10:
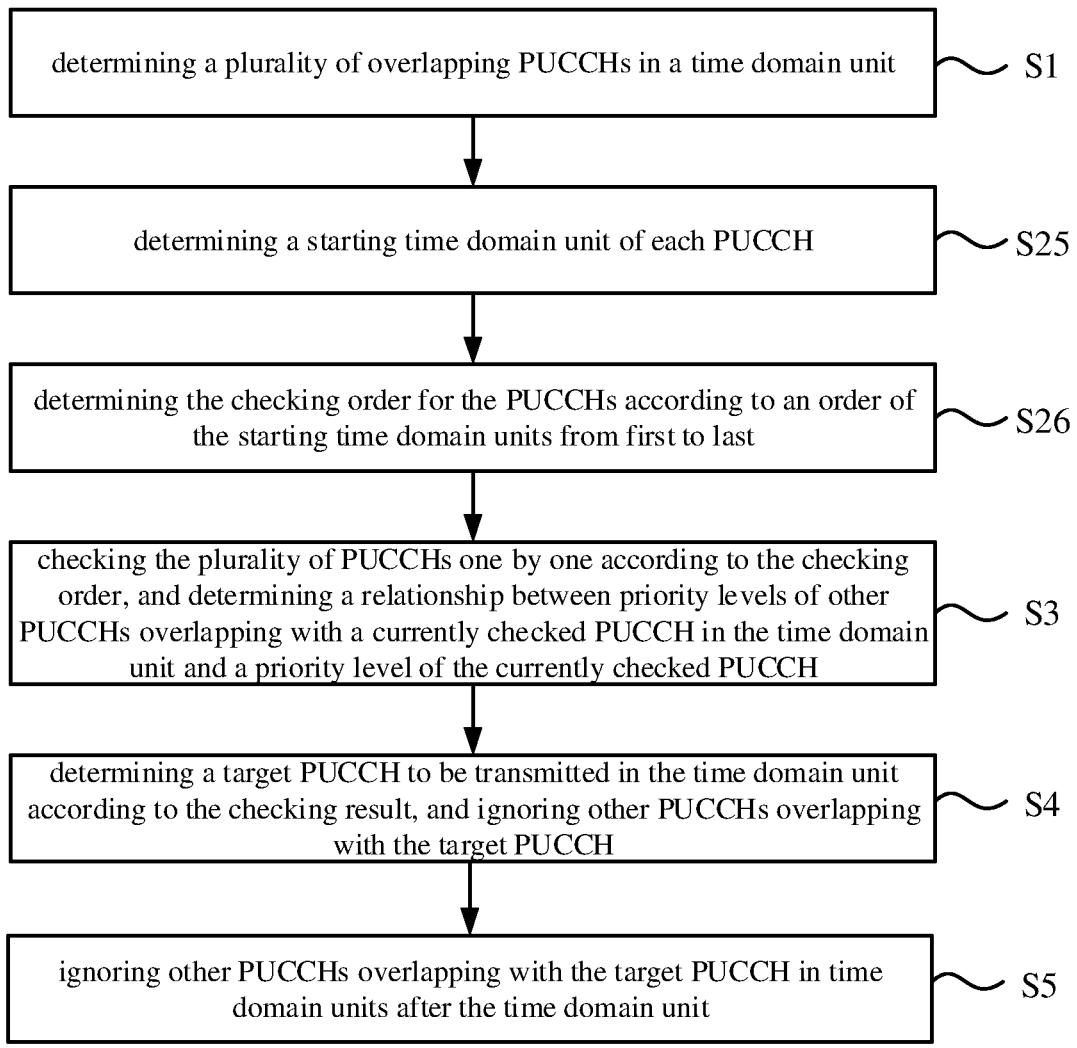
FIG. 10 is a flowchart illustrating a method for determining PUCCH to be transmitted according to yet another embodiment of the present disclosure.

FIG. 10 is a flowchart illustrating a method for determining PUCCH to be transmitted according to yet another embodiment of the present disclosure. As illustrated in FIG. 10, on the basis of the embodiment as illustrated in FIG. 9, the method further includes the following.

In step S5, other PUCCHs overlapping with the target PUCCH are ignored in time domain units after the time domain unit.

In an embodiment, in the case of determining the checking order for the PUCCHs according to the order of the starting time domain units from first to last, when the target PUCCH is determined in a certain time domain unit, other PUCCHs overlapping with the target PUCCH may be ignored. That is, in subsequent time domain units, when there are the target PUCCH and other PUCCHs overlapping the target PUCCH, other PUCCHs are ignored, and the target PUCCH is retained, such that the target PUCCH is still used as the PUCCH to be transmitted when there is no new PUCCH in the subsequent time domain units. When there is a new PUCCH in the subsequent time domain units, only the priority level of the target PUCCH is compared with that of the new PUCCH without considering the priority levels of other PUCCHs that have been ignored, thereby reducing the resource consumption.

Figure 11:
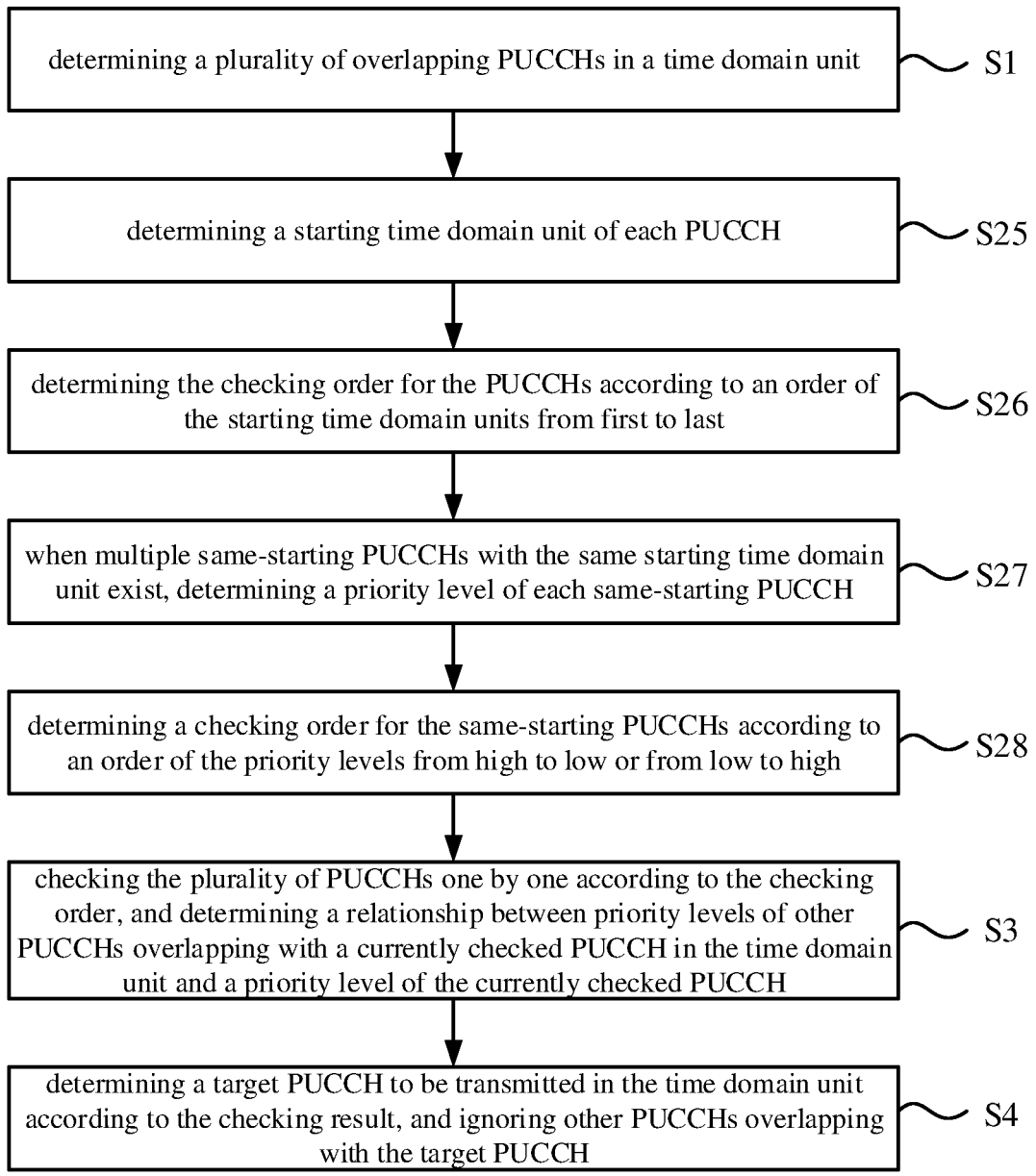
FIG. 11 is a flowchart illustrating a method for determining PUCCH to be transmitted according to yet another embodiment of the present disclosure.

FIG. 11 is a flowchart illustrating a method for determining PUCCH to be transmitted according to yet another embodiment of the present disclosure. As illustrated in FIG. 11, on the basis of the embodiment as illustrated in FIG. 9, determining the checking order for the PUCCHs according to the preset characteristic parameters of the PUCCHs further includes the followings.

In step S27, when multiple same-starting PUCCHs with the same starting time domain unit exist, a priority level of each same-starting PUCCH is determined.

In step S28, a checking order for the same-starting PUCCHs is determined according to an order of the priority levels from high to low or from low to high.

In an embodiment, the preset characteristic parameters may include various parameters, for example, the priority level of the PUCCH in addition to the starting time domain unit of the PUCCH in the embodiment illustrated in FIG. 9. In this embodiment, the checking order for the PUCCHs corresponding to the priority levels may be determined according to the order of the starting time domain units from first to last. In this process, there may be the same-starting PUCCHs with the same starting time domain unit.

For example, PUCCH4 and PUCCH5 are the same-starting PUCCHs with the same starting time domain unit. In order to determine the checking order for PUCCH4 and PUCCH5, the priority level of each same-starting PUCCH may be further determined, and then the checking order for the same-starting PUCCHs is determined according to the order of the priority levels from high to low or from low to high. For example, the checking order for the same-starting PUCCHs is determined according to the order of the priority levels from high to low, then when the priority level of PUCCH4 is higher than the priority level of PUCCH5, PUCCH4 may be determined first, and then PUCCH5 may be determined, thereby ensuring that the checking order for PUCCH4 and PUCCH5 may be determined.

Figure 12:
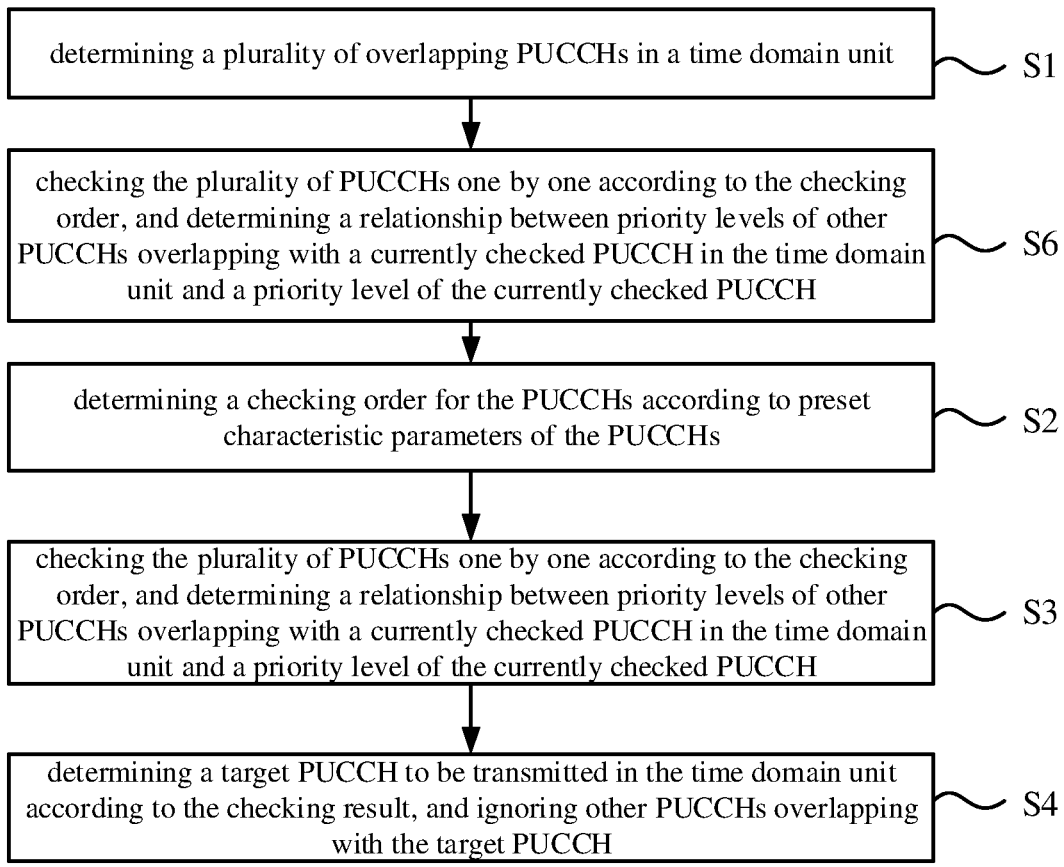
FIG. 12 is a flowchart illustrating a method for determining PUCCH to be transmitted according to yet another embodiment of the present disclosure.

FIG. 12 is a flowchart illustrating a method for determining PUCCH to be transmitted according to yet another embodiment of the present disclosure. As illustrated in FIG. 12, on the basis of the embodiment as illustrated in FIG. 4, the method further includes the followings.

In step S6, before determining the checking order for the PUCCHs according to the preset characteristic parameters of the PUCCHs, the priority level of each PUCCH is determined according to a type of UCI carried by each PUCCH.

In an embodiment, the priority level of the PUCCH may be determined based on the UCI carried by the PUCCH. The UCI includes the indication for the HARQ, the SR, the CSI, etc. The priority levels of the PUCCHs carrying different UCIs are different. For example, the priority level of the PUCCH carrying the indication for the HARQ is higher than the priority level of the PUCCH carrying the scheduling request, and the priority level of the PUCCH carrying the scheduling request is higher than the priority level of the PUCCH carrying the CSI.

Optionally, the time domain unit includes at least one of: a frame, a sub-frame, a time slot and a symbol.

Corresponding to the foregoing embodiments of the method for determining PUCCH to be transmitted, the present disclosure also provides embodiments of an apparatus for determining PUCCH to be transmitted.

Figure 13:
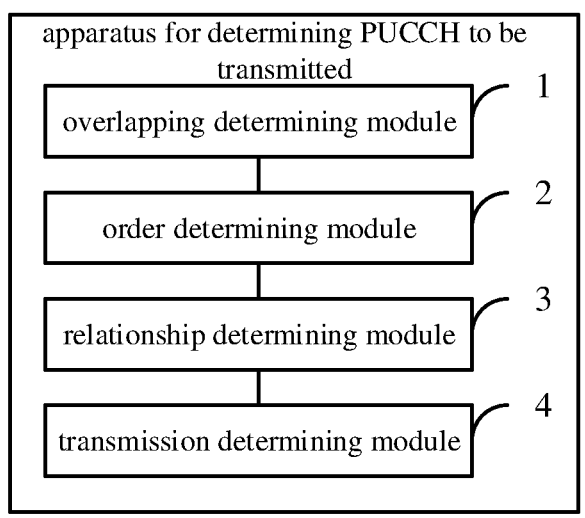
FIG. 13 is a block diagram illustrating an apparatus for determining PUCCH to be transmitted according to an embodiment of the present disclosure.

FIG. 13 is a block diagram illustrating an apparatus for determining PUCCH to be transmitted according to an embodiment of the present disclosure. The embodiments may be applicable for the user device, also be applicable for the base station. The user device may communicate with the base station. The user device may be an electronic device, such as a mobile phone, a tablet computer, a wearable device, and the user device may communicate with the base station based on 4G or 5G technology.

As illustrated in FIG. 13, the apparatus for determining PUCCH to be transmitted includes an overlapping determining module 1, an order determining module 2, a relationship determining module 3 and a transmission determining module 4.

The overlapping determining module 1 is configured to determine a plurality of overlapping PUCCHs in a time domain unit.

The order determining module 2 is configured to determine a checking order for the PUCCHs according to preset characteristic parameters of the PUCCHs.

The relationship determining module 3 is configured to check the plurality of PUCCHs one by one according to the checking order, and determine a relationship between priority levels of other PUCCHs overlapping with a currently checked PUCCH in the time domain unit and a priority level of the currently checked PUCCH.

The transmission determining module 4 is configured to determine a target PUCCH to be transmitted in the time domain unit according to the checking result, and ignore other PUCCHs overlapping with the target PUCCH.

Figure 14:
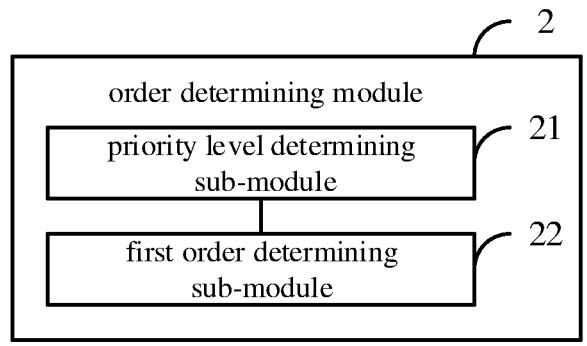
FIG. 14 is a block diagram illustrating an order determining module according to an embodiment of the present disclosure.

FIG. 14 is a block diagram illustrating an order determining module according to an embodiment of the present disclosure. As illustrated in FIG. 14, in the basis of the embodiment illustrated in FIG. 13, the order determining module 2 includes a priority level determining sub-module 21 and a first order determining sub-module 22.

The priority level determining sub-module 21 is configured to determine priority levels of the PUCCHs;

The first order determining sub-module 22 is configured to determine the checking order for the PUCCHs corresponding to the priority levels according to an order of the priority levels from high to low or from low to high.

Optionally, when the first order determining sub-module is configured to determine the checking order for the PUCCHs corresponding to the priority levels according to the order of the priority levels from high to low, the transmission determining module is configured to determine the currently checked PUCCH as the target PUCCH.

Optionally, when the first order determining sub-module is configured to determine the checking order for the PUCCHs corresponding to the priority levels according to the order of the priority levels from low to high, the transmission determining module is configured to: when none of PUCCHs to be checked overlaps with the currently checked PUCCH, determine the currently checked PUCCH as the target PUCCH; when any of the PUCCHs to be checked overlaps with the currently checked PUCCH, determine the PUCCH overlapping with the currently checked PUCCH as the target PUCCH.

Figure 15:
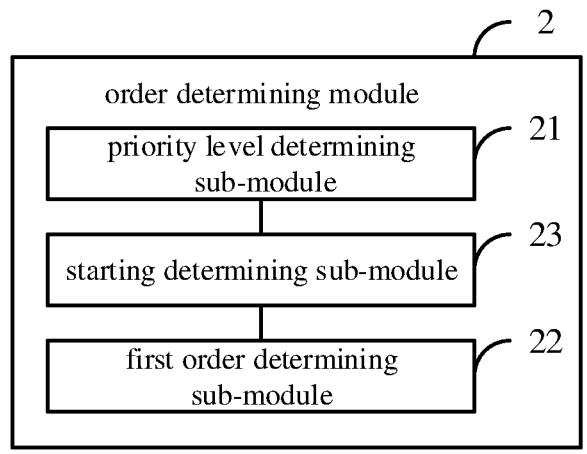
FIG. 15 is a block diagram illustrating an order determining module according to another embodiment of the present disclosure.

FIG. 15 is a block diagram illustrating an order determining module according to another embodiment of the present disclosure. As illustrated in FIG. 15, in the basis of the embodiment illustrated in FIG. 14, the order determining module 2 includes a starting determining sub-module 23.

The starting determining sub-module 23 is configured to when a plurality of same-level PUCCHs with the same priority level exist, determine a starting time domain unit of each same-level PUCCH.

In which, the first order determining sub-module 22 is configured to determine a checking order for the same-level PUCCHs according to an order of the starting time domain units from first to last.

Figure 16:
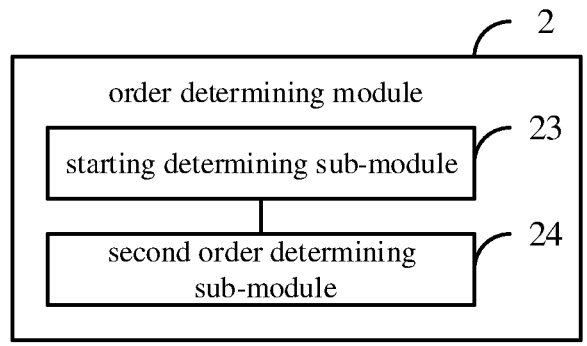
FIG. 16 is a block diagram illustrating an order determining module according to still another according to an embodiment of the present disclosure.

FIG. 16 is a block diagram illustrating an order determining module according to still another according to an embodiment of the present disclosure. As illustrated in FIG. 16, in the basis of the embodiment illustrated in FIG. 13, the order determining module 2 includes a starting determining sub-module 23 and a second order determining sub-module 24.

The starting determining sub-module 23 is configured to determine a starting time domain unit of each PUCCH;

The second order determining sub-module 24 is configured to determine the checking order for the PUCCHs according to an order of the starting time domain units from first to last.

Optionally, the transmission determining module is further configured to ignore other PUCCHs overlapping with the target PUCCH in time domain units after the time domain unit.

Figure 17:
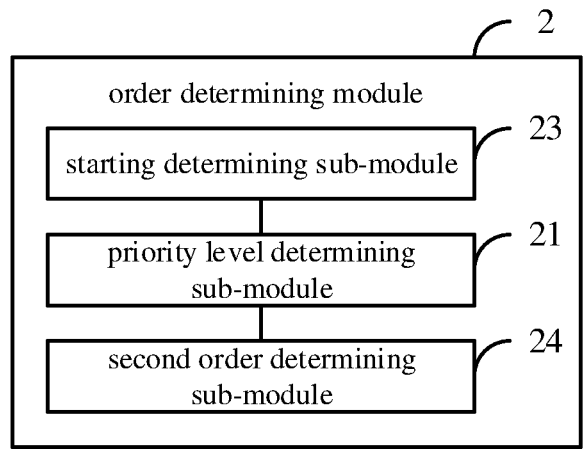
FIG. 17 is a block diagram illustrating order determining module according to yet another embodiment of the present disclosure.

FIG. 17 is a block diagram illustrating order determining module according to yet another embodiment of the present disclosure. As illustrated in FIG. 17, in the basis of the embodiment illustrated in FIG. 16, the order determining module 2 includes a priority level determining sub-module 21.

The priority level determining sub-module 21 is configured to when multiple same-starting PUCCHs with the same starting time domain unit exist, determine a priority level of each same-starting PUCCH;

In which, the second order determining sub-module 24 is configured to determine a checking order for the same-starting PUCCHs according to an order of the priority levels from high to low or from low to high.

Figure 18:
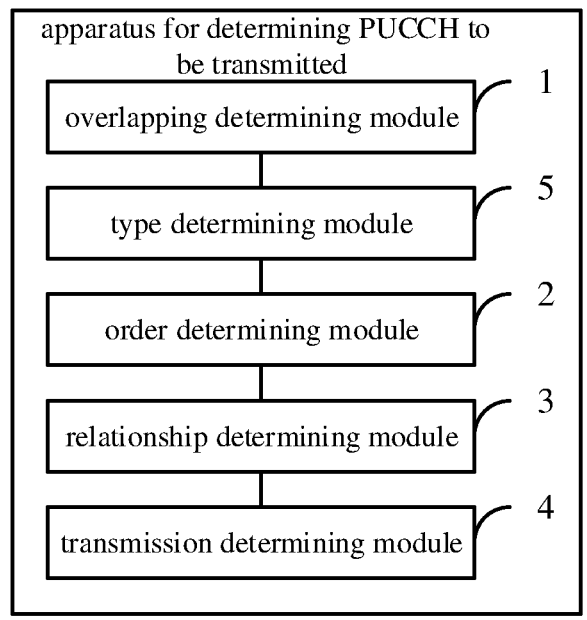
FIG. 18 is a block diagram illustrating an apparatus for determining PUCCH to be transmitted according to another embodiment of the present disclosure.

FIG. 18 is a block diagram illustrating an apparatus for determining PUCCH to be transmitted according to another embodiment of the present disclosure. As illustrated in FIG. 18, on the basis of the embodiment illustrated in FIG. 13, the apparatus further includes a type determining module 5.

The type determining module 5 is configured to determine the priority level of each PUCCH according to a type of UCI carried by each PUCCH.

Optionally, the time domain unit includes at least one of: a frame, a sub-frame, a time slot and a symbol.

Regarding the apparatus in the foregoing embodiments, the specific implements in which each module performs operations have been described in detail in the related method embodiments, and will not be described herein.

As for the apparatus embodiment, since it basically corresponds to the method embodiment, the relevant part can be referred to the description of the apparatus embodiment. The apparatus embodiments described above are merely exemplary. Units described as separate components may or may not be physically separated, and components displayed as units may or may not be physical units, that is, may be located in one place, or may be distributed to multiple network units. Some or all of the modules may be selected according to actual requirements to achieve the objectives of the solutions of the embodiments. It may be understood and implemented by those skilled in the art without creative work.

An electronic device is provided according to an embodiment of the present disclosure. The electronic device includes:

a processor;

a memory configured to store instructions executable by the processor;

in which, the processor is configured to execute the method according to any of the above embodiments.

A computer readable storage medium is provided according to an embodiment of the present disclosure. The computer readable storage medium has a program stored thereon, when the program is executed by a processor, steps of the method according to any of the above embodiments are implemented.

Figure 19:
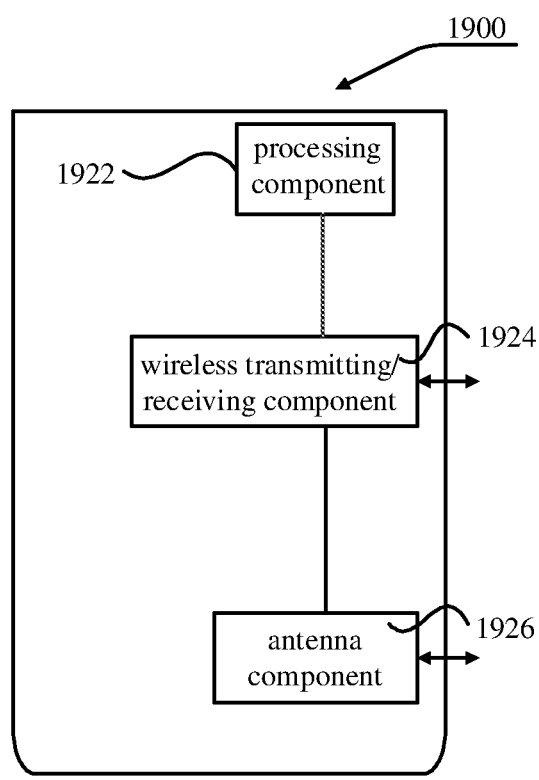
FIG. 19 is a schematic diagram illustrating a structure of an apparatus for determining PUCCH to be transmitted according to an embodiment of the present disclosure.

As illustrated in FIG. 19, FIG. 19 is a schematic diagram illustrating a structure of an apparatus 1900 for determining PUCCH to be transmitted according to an embodiment of the present disclosure. The apparatus 1900 may be provided as a base station. As illustrated in FIG. 19, the apparatus 1900 includes a processing component 1922, a wireless transmitting/receiving component 1924, an antenna component 1926, and a signal processing part specific to a wireless interface. The processing component 1922 may further include one or more processors. One of the processors in the processing component 1922 may be configured to execute the method according to any of the above embodiments.

Figure 20:
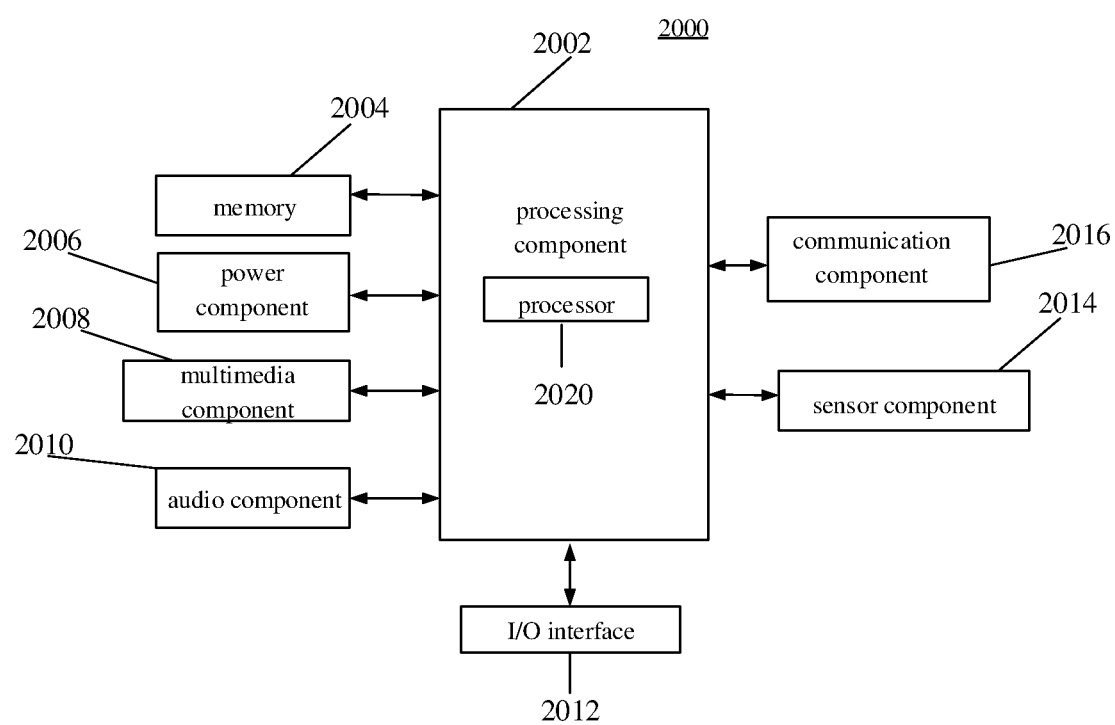
FIG. 20 is a schematic diagram illustrating another structure of an apparatus for determining PUCCH to be transmitted according to an embodiment of the present disclosure.

FIG. 20 is a schematic diagram illustrating another structure of an apparatus for determining PUCCH to be transmitted according to an embodiment of the present disclosure. For example, the apparatus 2000 may be a smartphone, a computer, a digital broadcasting terminal, a tablet device, a massage transmitter/receiver, a game console, a medical device, a fitness device, a personal digital assistant, etc.

As illustrated in FIG. 20, the apparatus 2000 may include one or more of the following components: a processing component 2002, a memory 2004, a power component 2006, a multimedia component 2008, an audio component 2020, an input/output (I/O) interface 2012, a sensor component 2014, and a communication component 2016.

The processing component 2002 typically controls overall operations of the apparatus 2000, such as the operations associated with display, telephone calls, data communications, camera operations, and recording operations. The processing component 2002 may include one or more processors 2020 to execute instructions. Moreover, the processing component 2002 may include one or more modules which facilitate the interaction between the processing component 2002 and other components. For instance, the processing component 2002 may include a multimedia module to facilitate the interaction between the multimedia component 2008 and the processing component 2002.

The memory 2004 is configured to store various types of data to support the operation of the apparatus 2000. Examples of such data include instructions for any applications or methods operated on the apparatus 2000, contact data, phonebook data, messages, pictures, video, etc. The memory 2004 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 2006 provides power to various components of the apparatus 2000. The power component 2006 may include a power management system, one or more power sources, and any other components associated with the generation, management, and distribution of power in the apparatus 2000.

The multimedia component 2008 includes a screen providing an output interface between the apparatus 2000 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 2008 includes a front camera and/or a rear camera. When the apparatus 2000 is in an operation mode, such as a shooting mode or a video mode, the front camera and/or the rear camera can receive external multimedia data. Each front camera and rear camera can be a fixed optical lens system or have focal length and optical zoom capabilities.

The audio component 2010 is configured to output and/or input audio signals. For example, the audio component 2010 includes a microphone ("MIC") configured to receive an external audio signal when the apparatus 2000 is in an operation mode, such as a call mode, a recording mode, and a voice recognition mode. The received audio signal may be further stored in the memory 2004 or transmitted via the communication component 2016. In some embodiments, the audio component 2010 further includes a speaker for outputting audio signals.

The I/O interface 2012 provides an interface between the processing component 2002 and peripheral interface modules, such as a keyboard, a click wheel, buttons, and the like. The buttons may include but are not limited to: home button, volume button, start button, and lock button.

The sensor component 2014 includes one or more sensors to provide status assessments of various aspects of the apparatus 2000. For instance, the sensor component 2014 may detect an open/closed status of the apparatus 2000, relative positioning of components, e.g., the display and the keypad, of the apparatus 2000, a change in position of the apparatus 2000 or a component of the apparatus 2000, a presence or absence of a target object contact with the apparatus 2000, an orientation or an acceleration/deceleration of the apparatus 2000, and a change in temperature of the apparatus 2000. The sensor assembly 2014 may include a proximity sensor configured to detect the presence of nearby objects without any physical contact. The sensor component 2014 may also include a light sensor, such as a CMOS or CCD image sensor, applicable for imaging applications. In some embodiments, the sensor component 2014 may also include an acceleration sensor, a gyroscope sensor, a magnetic sensor, a pressure sensor or a temperature sensor.

The communication component 2016 is configured to facilitate communication, wired or wirelessly, between the apparatus 2000 and other devices. The apparatus 2000 can access a wireless network based on a communication standard, such as WiFi, 2G, or 3G, or a combination thereof. In one exemplary embodiment, the communication component 2016 receives a broadcast signal or broadcast associated information from an external broadcast management system via a broadcast channel. In one exemplary embodiment, the communication component 2016 further includes a near field communication (NFC) module to facilitate short-range communications. For example, the NFC module may be implemented based on a radio frequency identity (RFID) technology, an infrared data association (IrDA) technology, an ultra-wideband (UWB) technology, a Bluetooth (BT) technology, and other technologies.

In exemplary embodiments, the apparatus 2000 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components. The apparatus 2000 is configured to execute the method according to any of the above embodiments.

In exemplary embodiments, there is also provided a computer readable storage medium such as a memory 2004 stored instructions, the instructions may be executed by a processor 2020 of the apparatus 2000 to implement the method mentioned above. For example, the readable storage medium may be a ROM, a RAM, a CD-ROM, a magnetic tape, a floppy disc, an optical data storage device, and the like.

After considering the specification and practicing the disclosure disclosed herein, those skilled in the art will easily think of other embodiments of the present disclosure. This disclosure is intended to cover any variations, purposes, or adaptive changes of the present disclosure. These variations, purposes, or adaptive changes follow general principles of the present disclosure and include common knowledge or conventional technical means in the technical field not disclosed in the present disclosure. The description and the embodiments are only regarded as exemplary, and the true scope and spirit of the present disclosure are pointed out by the following claims.

It should be understood that the present disclosure is not limited to the precise structure that has been described above and illustrated in the drawings, and various modifications and changes can be made without departing from its scope. The scope of the present disclosure is only limited by the appended claims.

It should be noted that in this disclosure, relational terms such as first and second are only used to distinguish one entity or operation from another entity or operation, and do not necessarily require or imply there is any such actual relationship or sequence between these entities or operations. The terms "include", "comprise" or any other variants thereof are intended to cover non-exclusive inclusion, so that processes, methods, objects, or devices including a series of elements not only includes those elements, but also includes other elements not explicitly listed, or also include elements inherent to such processes, methods, objects, or devices. If there are no more limitation, the elements defined by a sentence "including a . . . " does not exclude existence of other same elements in the processes, methods, objects, or devices that includes the elements.

The methods and devices provided by the embodiments of the present disclosure are described in detail above. Specific examples are used in this disclosure to illustrate principles and implementations of the present disclosure. The descriptions of the above embodiments are only used to help understand the method and its core idea of the present disclosure. At the same time, for those skilled in the art, there will be changes in the specific implementation and the scope of application according to the idea of the present disclosure. In summary, content of this specification should not be construed as limitations to the present disclosure.

What is claimed is:

1. A method for determining a physical uplink control channel (PUCCH) to be transmitted, comprising:
   determining a plurality of overlapping PUCCHs in a time domain unit;
   determining a checking order for the PUCCHs according to preset characteristic parameters of the PUCCHs;
   checking the plurality of PUCCHs one by one according to the checking order, and determining a relationship between priority levels of other PUCCHs overlapping with a currently checked PUCCH in the time domain unit and a priority level of the currently checked PUCCH; and
   determining a target PUCCH to be transmitted in the time domain unit according to a checking result, and ignoring other PUCCHs overlapping with the target PUCCH.

2. The method according to claim 1, wherein determining the checking order for the PUCCHs according to the preset characteristic parameters of the PUCCHs comprises:
   determining priority levels of the PUCCHs; and
   determining the checking order for the PUCCHs corresponding to the priority levels according to an order of the priority levels from high to low or from low to high.

3. The method according to claim 2, wherein, when the checking order for the PUCCHs corresponding to the priority levels is determined according to the order of the priority levels from high to low, determining the target PUCCH to be transmitted in the time domain unit according to the checking result comprises:
   determining the currently checked PUCCH as the target PUCCH.

4. The method according to claim 2, wherein, when the checking order for the PUCCHs corresponding to the priority levels is determined according to the order of the priority levels from low to high, determining the target PUCCH to be transmitted in the time domain unit according to the checking result comprises:
   when none of PUCCHs to be checked overlaps with the currently checked PUCCH, determining the currently checked PUCCH as the target PUCCH; and
   when any of the PUCCHs to be checked overlaps with the currently checked PUCCH, determining the PUCCH overlapping with the currently checked PUCCH as the target PUCCH.

5. The method according to claim 2, wherein determining the checking order for the PUCCHs according to the preset characteristic parameters of the PUCCHs further comprises:
   when a plurality of same-level PUCCHs with [[the]] a same priority level exist, determining a starting time domain unit of each same-level PUCCH; and
   determining a checking order for the same-level PUCCHs according to an order of the starting time domain units from first to last.

6. The method according to claim 1, wherein determining the checking order for the PUCCHs according to the preset characteristic parameters of the PUCCHs comprises:
   determining a starting time domain unit of each PUCCH; and
   determining the checking order for the PUCCHs according to an order of the starting time domain units from first to last.

7. The method according to claim 6, further comprising:
   ignoring other PUCCHs overlapping with the target PUCCH in time domain units after the time domain unit.

8. The method according to claim 6, wherein determining the checking order for the PUCCHs according to the preset characteristic parameters of the PUCCHs comprises:
   when multiple same-starting PUCCHs with the same starting time domain unit exist, determining a priority level of each same-starting PUCCH; and
   determining a checking order for the same-starting PUCCHs according to an order of the priority levels from high to low or from low to high.

9. The method according to claim 1, further comprising:
   before determining the checking order for the PUCCHs according to the preset characteristic parameters of the PUCCHs, determining the priority levels of the PUCCHs according to a type of uplink control information (UCI) carried by the PUCCHs, respectively.

10. The method according to claim 1, wherein the time domain unit comprises at least one of: a frame, a sub-frame, a time slot and a symbol.

11. An electronic device, comprising:
    a processor; and
    a memory configured to store instructions executable by the processor;
    wherein the processor is configured to:
    determine a plurality of overlapping physical uplink control channels (PUCCHs) in a time domain unit;
    determine a checking order for the PUCCHs according to preset characteristic parameters of the PUCCHs;
    check the plurality of PUCCHs one by one according to the checking order, and determine a relationship between priority levels of other PUCCHs overlapping with a currently checked PUCCH in the time domain unit and a priority level of the currently checked PUCCH; and
    determine a target PUCCH to be transmitted in the time domain unit according to a checking result, and ignore other PUCCHs overlapping with the target PUCCH.

12. A non-transitory computer readable storage medium having a computer program stored thereon, wherein, when the computer program is executed by a processor of an electronic device, the electronic device is caused to perform a method for determining a physical uplink control channel (PUCCH) to be transmitted, the method comprising:
    determining a plurality of overlapping PUCCHs in a time domain unit;
    determining a checking order for the PUCCHs according to preset characteristic parameters of the PUCCHs;
    checking the plurality of PUCCHs one by one according to the checking order, and determining a relationship between priority levels of other PUCCHs overlapping with a currently checked PUCCH in the time domain unit and a priority level of the currently checked PUCCH; and
    determining a target PUCCH to be transmitted in the time domain unit according to a checking result, and ignoring other PUCCHs overlapping with the target PUCCH.

13. The electronic device according to claim 11, wherein the processor is further configured to:
    determine priority levels of the PUCCHs; and
    determine the checking order for the PUCCHs corresponding to the priority levels according to an order of the priority levels from high to low or from low to high.

14. The electronic device according to claim 13, wherein the checking order for the PUCCHs corresponding to the priority levels is determined according to the order of the priority levels from high to low, and the processor is further configured to:

determine the currently checked PUCCH as the target PUCCH.

15. The electronic device according to claim 13, wherein the checking order for the PUCCHs corresponding to the priority levels is determined according to the order of the priority levels from low to high, and the processor is further configured to:

when none of PUCCHs to be checked overlaps with the currently checked PUCCH, determine the currently checked PUCCH as the target PUCCH; and when any of the PUCCHs to be checked overlaps with the currently checked PUCCH, determine the PUCCH overlapping with the currently checked PUCCH as the target PUCCH.

16. The electronic device according to claim 13, wherein the processor is further configured to:

when a plurality of same-level PUCCHs with a same priority level exist, determine a starting time domain unit of each same-level PUCCH; and determine a checking order for the same-level PUCCHs according to an order of the starting time domain units from first to last.

17. The electronic device according to claim 11, wherein the processor is further configured to:

determine a starting time domain unit of each PUCCH; and determine the checking order for the PUCCHs according to an order of the starting time domain units from first to last.

18. The electronic device according to claim 17, wherein the processor is further configured to:

ignore other PUCCHs overlapping with the target PUCCH in time domain units after the time domain unit.

19. The electronic device according to claim 17, wherein the processor is further configured to:

when multiple same-starting PUCCHs with the same starting time domain unit exist, determine a priority level of each same-starting PUCCH; and determine a checking order for the same-starting PUCCHs according to an order of the priority levels from high to low or from low to high.

20. The electronic device according to claim 11, wherein the processor is further configured to:

before determining the checking order for the PUCCHs according to the preset characteristic parameters of the PUCCHs, determine the priority levels of the PUCCHs according to a type of uplink control information (UCI) carried by the PUCCHs, respectively.

* * * * *